United States Patent
Franke et al.

(10) Patent No.: US 12,360,967 B2
(45) Date of Patent: Jul. 15, 2025

(54) OBJECT STORAGE DEDUPLICATION

(71) Applicant: International Business Machines Corporation, Armonk, NY (US)

(72) Inventors: Hubertus Franke, Cortlandt Manor, NY (US); Marcio Augusto De Lima E Silva, Mogi das Cruzes (BR); Tobin Feldman-Fitzthum, New York, NY (US); Krishna Thangaraj, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 18/172,362

(22) Filed: Feb. 22, 2023

(65) Prior Publication Data
US 2024/0281417 A1    Aug. 22, 2024

(51) Int. Cl.
*G06F 16/215*    (2019.01)
*G06F 16/21*    (2019.01)
*G06F 16/28*    (2019.01)

(52) U.S. Cl.
CPC .......... *G06F 16/215* (2019.01); *G06F 16/219* (2019.01); *G06F 16/289* (2019.01)

(58) Field of Classification Search
CPC ......... G06F 16/215; G06F 16/21; G06F 16/28
See application file for complete search history.

(56) References Cited

U.S. PATENT DOCUMENTS

| | | |
|---|---|---|
| 8,380,681 B2 | 2/2013 | Oltean |
| 9,514,146 B1 | 12/2016 | Wallace et al. |
| 9,846,700 B2 | 12/2017 | Bagal |
| 10,048,959 B2* | 8/2018 | Sun .................. H04L 65/40 |
| 10,599,355 B2 | 3/2020 | Xie |
| 10,642,794 B2 | 5/2020 | Clements |
| 10,678,435 B2 | 6/2020 | Swift |
| 10,715,314 B2 | 7/2020 | Gauda |
| 11,093,464 B1 | 8/2021 | Wang |
| 11,216,199 B2 | 1/2022 | Armangau |
| 11,314,724 B2 | 4/2022 | Chalmer |
| 2017/0177266 A1 | 6/2017 | Doerner et al. |
| 2017/0249140 A1* | 8/2017 | Sun .................. G06F 8/658 |

(Continued)

FOREIGN PATENT DOCUMENTS

| | | | |
|---|---|---|---|
| CN | 101551817 A | 10/2009 | |
| CN | 105404521 A * | 3/2016 | ............. G06F 8/658 |

(Continued)

OTHER PUBLICATIONS

No Author, "Best Object Storage Software", Accessed on 1/1/7/2023, 42 Pgs., <https://www.g2.com/categories/object-storage>.

(Continued)

*Primary Examiner* — Maher N Algibhah
(74) *Attorney, Agent, or Firm* — David K. Mattheis

(57) ABSTRACT

Storing compressed data objects by decompressing a first data object, identifying, differences between the first and second data objects, creating a new version of the second data object according to the differences, the first data object, and a reference object, and storing the first data object and the new version of the second data object.

21 Claims, 4 Drawing Sheets

(56) References Cited

U.S. PATENT DOCUMENTS

2018/0024746 A1* 1/2018 Jagadeesh ............... G06F 3/064
                                                                711/154
2019/0379394 A1* 12/2019 Hallak ................. G06F 16/1744
2021/0096746 A1   4/2021 Narayanan et al.
2021/0286783 A1   9/2021 Armangau

FOREIGN PATENT DOCUMENTS

CN     110908589 A  *  3/2020  ........... G06F 3/0604
CN     113805930 A     12/2021
WO     2024/176011      8/2024

OTHER PUBLICATIONS

Yakovenko., "An Informal Introduction to DOCX", Developers, 2 Pgs, Accessed Jan. 17, 2023, <https://ww.toptal.com/xml/an-informal-introduction-to-docs>.

International Searching Authority, Notification of Transmittal of the International Search Report and the Written Opinion of the or the International Searching Authority, or declaration, Jun. 28, 2024, 8 Pages, PCT Application No. IB2024/050640.

* cited by examiner

US 12,360,967 B2

OBJECT STORAGE DEDUPLICATION

FIELD OF THE INVENTION

The disclosure relates generally to the deduplication of data for object storage. The invention relates particularly to the deduplication of data objects at a structural level.

BACKGROUND

Extensive use is made of cloud-object-storage (COS) systems. Objects in such COS systems are considered immutable. Such systems provide backend support for documents sharing. Document versioning is pervasive in the use of these systems. Deduplication of stored data enables reductions in required storage resources and associated costs.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable storage of data compressed data objects by decompressing a data object including a first structural fragment, identifying, in a second data object, a second structural fragment which is identical to the first structural fragment, replacing the first structural fragment with a first link to the second structural fragment in the second data object, and storing the first data object including the link in place of the first structural object.

Aspects of the invention disclose methods, systems and computer readable media associated with storing compressed data objects by decompressing a first data object, identifying, differences between the first and second data objects, creating a new version of the second data object according to the differences, the first data object, and a reference object, and storing the first data object and the new version of the second data object.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
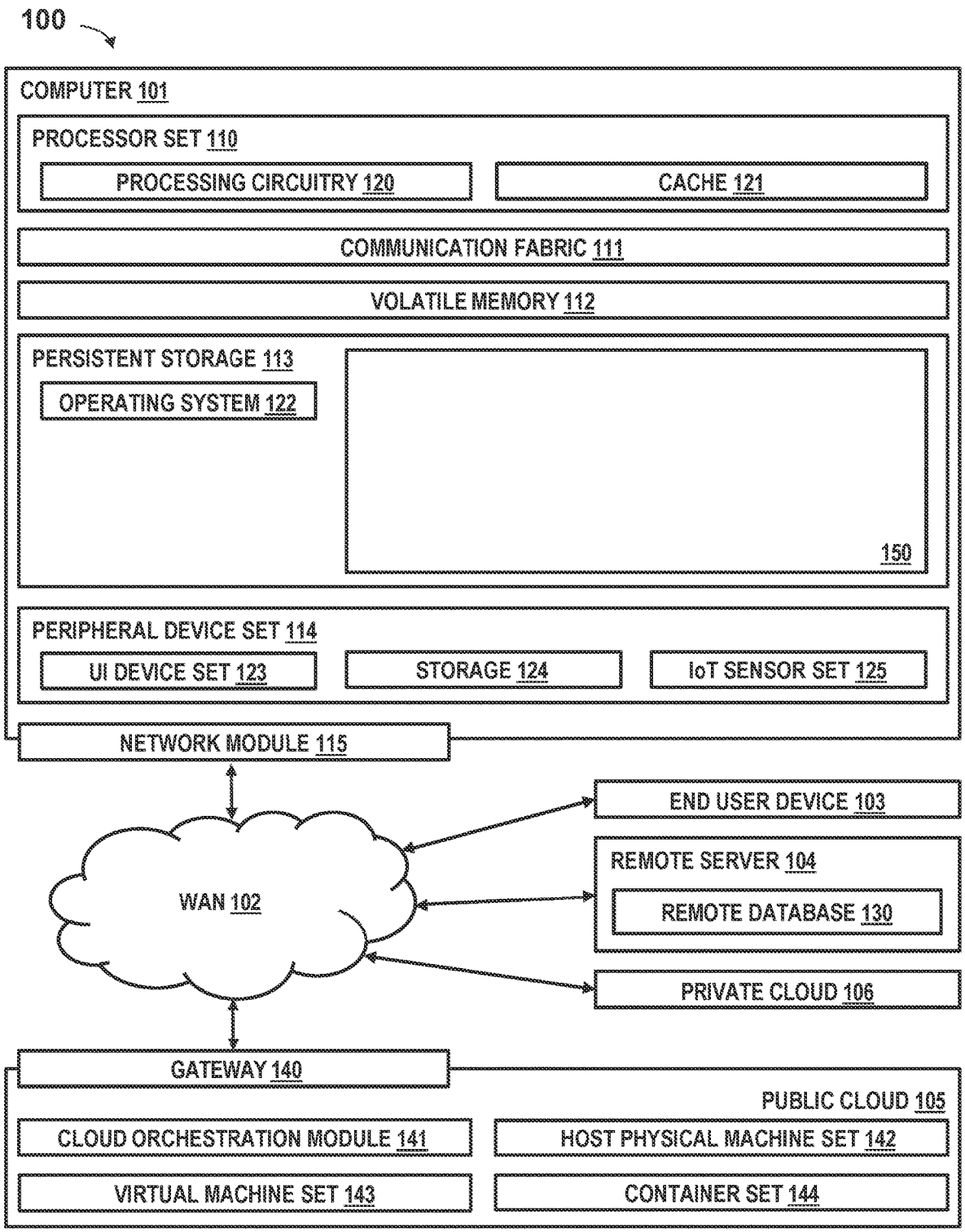
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Multiple versions of a single document contain duplicative data. Storing full copies of each version of the document requires large quantities of storage resources. Attempts to deduplicate data files at a data block level seldom prove effective as at such a level there is little if any full duplication. I.e., even slight changes in a given document file between versions yield sets of data blocks for each version with no duplicate data blocks. Disclosed embodiments provide systems and methods for reducing the storage requirements for documents versions by breaking documents down into fragments which are duplicated across similar versions of a document. Such fragments may then be deduplicated with only a single original version of each fragment being stored. Disclosed embodiments maintain all necessary versioning information including version time-stamps, etc.

Aspects of the present invention relate generally to COS (cloud object storage) systems and, more particularly, to reducing the storage requirements for compressed objects in such systems. In embodiments, a COS system receives a compressed first data object for storage, decompresses the object revealing structural fragments (files) making up the compressed first data object, identifies duplicate structural fragments in a stored second data object, replaces the actual structural fragment of the first data object with a link to the location of the duplicate structural fragment in the second data object, and stores the first data object reduced in size by the replacement of the structural fragment with a link. According to aspects of the invention, the COS system automatically and dynamically reduces the size of data objects presented for storage by replacing structural fragments with links. In this manner, implementations of the invention reduce the storage resources required for documents having duplicative content, such as multiple versions of a single document having only slight changes between versions.

In accordance with aspects of the invention there is a method for automatically deduplicating objects for storage. The method comprising: receiving a compressed first data object for storage; decompressing the first data object into constituent structural fragments stored in a temporary directory, identifying a structural fragment stored as part of a second data object, which is identical to a structural fragment in the temporary directory, replacing the structural fragment in the temporary directory with a link to the identical structural fragment in the second data object, storing the revised first data object containing the link, and deleting the temporary directory.

Aspects of the invention provide an improvement in the technical field of COS systems. Conventional COS systems store full copies of each data object submitted for storage. In many cases, users submit multiple versions of a single document which the COS stores complete copies of, regardless of any level to which the versions contain identical data portions. For example, multiple versions of a presentation slide deck may all include a base set of unedited slides, typical COS systems store full copies of each version, while disclosed embodiments enable the storage of only those portions of each revised version which differ from the previous versions. As a result, disclosed embodiments enable storage of the set of document versions with the use of fewer storage resources as duplicate data portions are stored only once across the set of document versions. Implementations of the invention leverage the formatting structure of certain documents to decompress such documents into constituent parts which can then be compared with the parts of previous versions, replaced with links to identical portions of other versions, and deduplicated. This provides the improvement of reducing the overall storage requirements for the set of document versions while at the same time retaining all versioning metadata for the set of document versions.

Aspects of the invention also provide an improvement to computer functionality. In particular, implementations of the invention are directed to a specific improvement to the way COS systems operate, embodied in the identification and replacement of duplicate data portions with links requiring fewer storage resources. In embodiments, the system decompresses data objects submitted for storage, identifies duplicative structural fragments of such data objects, replaces those structural fragments with links to identical fragments, and stores the revised data object including links rather than the original (larger) fragments. Utilization of this process enables the storage of complete sets of document versions using fewer storage resources of the system while enabling full access to all members of the set of document versions submitted for storage. Providing storage and access for a set of documents while using fewer resources represents an improvement in system operations as such a system has an increased effective storage capacity without actually expanding the system's storage resources.

As an overview, a COS system is a data storage system which receives data objects and stores such objects across multiple cloud resources enabling sharing of such resource across user groups having access to the cloud resources. The COS system receives data objects from various sources including input over a network, a corpus of electronic documents or other data, data from a content creator, information from one or more content users, and other such inputs from other possible sources of input. Data storage devices store the corpus of data. A content creator creates content in a document for use as part of a corpus of data stored by the COS system. The document may include any file, text, article, or source of data stored in the COS system and accessed by a single user or a group of users. Multiple versions of a single document may be generated and stored using the COS system. Such versions may contain large amounts of duplicative data. Storing full copies of all such versions potentially wastes storage resources by storing multiple copies of identical data elements.

In an embodiment, one or more components of the system can employ hardware and/or software to solve problems that are highly technical in nature (e.g., decompressing data objects, identifying identical structural fragments, replacing identical fragments with links, storing revised data objects, etc.). These solutions are not abstract and cannot be performed as a set of mental acts by a human due to the processing capabilities needed to facilitate efficient data object storage, for example. Further, some of the processes performed may be performed by a specialized computer for carrying out defined tasks related to data object storage. For example, a specialized computer can be employed to carry out tasks related to data object storage or the like.

In an embodiment, systems and methods intercept the execution of data object storage and retrieval (loading) operations. Systems and methods may be applied to data objects having known data formats including data compression formats such as those used for the compression of files, including, without being limiting, MICROSOFT OFFICE OPEN XML (OOXML), and MICROSOFT OPEN OFFICE FORMAT (ODF). OOXML and ODF store documents as a directory of compressed data files.

(Note: the term(s) "LINUX", "MICROSOFT OFFICE OPEN XML", "OOXML", "MICROSOFT OPEN OFFICE FORMAT", "POWERPOINT" and "ODF", may be subject to trademark rights in various jurisdictions throughout the world and are used here only in reference to the products or services properly denominated by the marks to the extent that such trademark rights may exist.).

In an embodiment, when saving a data object, disclosed methods decompress the object into fragments listed in a temporary directory. Methods then compare the fragments of the current version to stored fragments of prior versions, or in one embodiment, fragments of other stored documents. Methods revise the temporary directory of the data object, replacing fragments of the current version which are identical to other stored fragments, with links to the locations of the identical fragments already being stored. Methods then store the data object, including a revised directory of the data object including the links rather than actual fragments-copied from the temporary directory. In an embodiment, methods include a new directory of linked objects as part of the revised data object. In an embodiment, methods then delete the temporary directory.

In this embodiment, when loading the data object, methods review the directory of the data object and retrieve copies of the actual fragments represented by links in the directory of the stored object. Methods then reconstruct the data object using the stored and retrieved fragments of the object. Methods compress the reconstructed version of the data object to its original format. Methods then provide the compressed reconstructed object to the user.

In an embodiment, methods may further enhance the storage process through the application of known compression and encryption methods to the data object after making revisions to the object and prior to storage of the object. In this embodiment, methods then augment the loading process with the additional steps of decompressing the data object and de-encrypting the object before providing the object to the user.

In an embodiment, methods apply a hash function to each fragment of each data object to facilitate more efficient comparisons of data object fragments across versions and across otherwise dissimilar objects in storage. In an embodiment, methods apply a hash function such as SHA256, to each fragment, storing the resulting hash function values. In this embodiment, the method then searches across the stored hash values for identical fragments according to the respective hash function values.

In an embodiment, methods receive an instruction to delete the stored object comprising the original, or underlying, version of a fragment, to which at least one data object relies upon through a location link to that fragment. As simple deletion of this object would result in breaking all links to the original fragment, methods take the following additional steps to ensure that all other stored objects may be successfully reconstructed: for each link to an original stored fragment, methods increment a metadata counter (refcount) by one, providing a total count of all links to each stored fragment. Responsive to receiving a delete object command, methods review, or descend the current directory of the target data object, identifying any object fragments having a non-zero value for refcount, indicating that other stored objects contain links to the original fragment forming a portion of the target data object. For each such identified original fragment of the target data object, methods then sequentially review newer versions of the target data object, beginning with the version closest in time to the target data object. Methods identify the first such version including a link to the original fragment and replace the link in this first version with a copy of the original fragment. Methods then continue to review newer stored versions, replacing links to the original fragment in the target data object with links to the fragment inserted into the first version. Methods continue to replace links in this manner until the total links replaced by either a copy of the fragment, in the case of the first newer version, or old links replaced with new links, equals the total link count for the fragment. Methods revise object directories accordingly and store the revised objects. Responsive to making replacements sufficient to satisfy the total link counts for all fragments of the target data object, methods delete the target data object. In an embodiment, link metadata further includes the locations of data objects comprising links to each original fragment in addition to the total refcount value for each original fragment.

As shown in FIG. 1, computing environment 100 contains an example of an environment for the execution of at least some of the computer code involved in performing the inventive methods, such as deduplicating data from sets of data objects destined for cloud storage, 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory located in the processor chip package(s) and typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
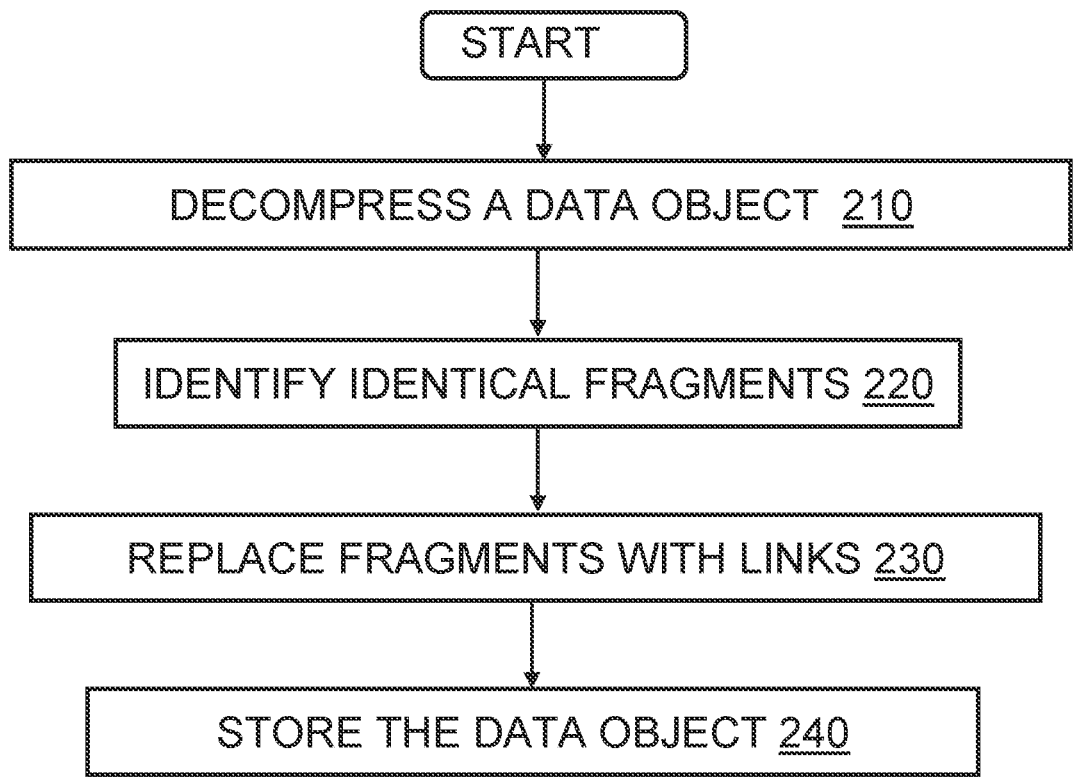
FIG. 2 provides a flowchart depicting an operational sequence, according to an embodiment of the invention.

FIG. 2 provides a flowchart 200, illustrating exemplary activities associated with the practice of disclosure. After program start, at block 210, methods of the object storage program 150, receive a compressed data object for storage. Such a data object may be compressed using a format including, but not limited to, OOXML, ODF, etc. Methods proceed to decompress the received data object, representing the structural fragments, files and subfiles, of the object in a temporary directory tree structure.

At block 220, methods scan known fragments of stored data objects, identifying stored fragments which are identical to fragments of the now decompressed target data object received for storage. In an embodiment, methods hash all fragments of stored objects. In this embodiment, methods hash the fragments of the received data object and utilize the hashed values for the fragments in identifying identical stored fragments across the storage system, such as a cloud object storage system.

At block 230, methods replace identified fragments in the temporary directory for the target data object with links to the locations of identified identical fragments held in storage. In an embodiment, the revisions include changes to file directories of the target data object reflecting the replacement of fragments with location links. In an embodiment, the revisions include the addition of a new directory comprising the links to original fragments. In an embodiment, method increment a metadata reference counter for the linked fragment by one and in some embodiments further store the data object location now comprising a link to the fragment.

At block 240, methods store the revised data object now comprising location links rather than original fragments. In an embodiment, methods compress and/or encrypt the revised version of the data object.

Figure 3:
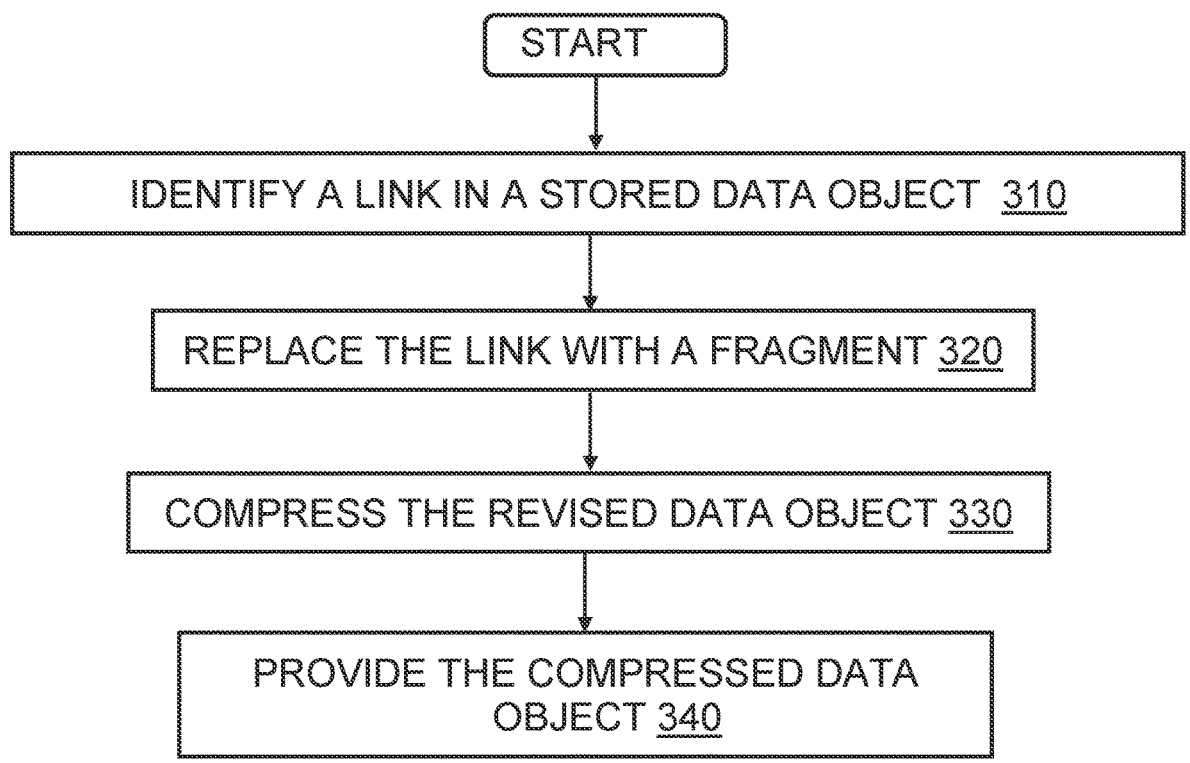
FIG. 3 provides a flowchart depicting an operational sequence, according to an embodiment of the invention.

FIG. 3 provides a flow chart 300, of operational steps associated with loading a data object stored utilizing the method set forth in FIG. 2 and described above. At block 310, methods of object storage program 150, receive a command to load a stored data object containing links to original fragments. Methods descend the directory of the data object identifying links to the locations of original fragments. In an embodiment, methods decompress the data object which earlier steps had compressed prior to storage. In an embodiment, methods decrypt the retrieved data object which earlier steps had encrypted prior to storage.

At block 320, methods reconstruct the original data object, revising the directory of the data object by replacing each location link with a copy of the original fragment from the location. At block 330, methods compress the reconstructed to the original data object format in which it was received for storage.

At block 340, methods provide the data object, now reconstructed to include all fragments and compressed to its original format, to a requesting user.

Figure 4:
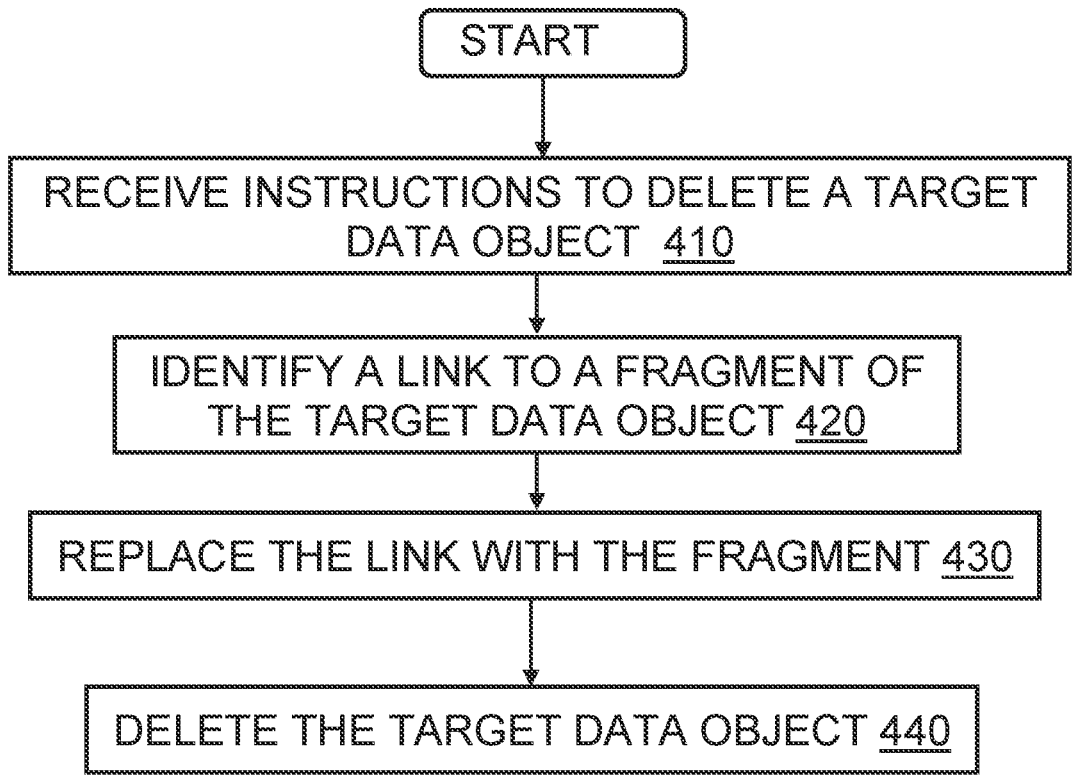
FIG. 4 provides a flowchart depicting an operational sequence, according to an embodiment of the invention.

FIG. 4 provides flowchart 400, illustrating operational steps associated with the deletion of a stored data object comprising original fragments to which other stored data object has links.

At block 410, methods receive an instruction to delete a stored data object, the target data object. Methods retrieve the stored data object, and if necessary, decompress and/or decrypt the retrieved data object.

At block 420, methods descend the directory tree of the retrieved data object, identifying fragments having non-zero metadata link reference counts. In an embodiment, beginning with the stored data object, methods sequentially scan along a system timeline, newer version of the data object, or other data objects stored more recently than the target data object, seeking the first such data object comprising a link to the original fragment of the target data object, i.e., the oldest such data object.

At block 430, methods replace the link in the oldest data object with a copy of the original fragment from the target data object. In an embodiment, the method proceeds to scan all data objects newer than the target object, replacing all links to the original fragment of the target data object with links to the new location of the original fragment in the first data object. Methods continue searching and replacing links to the original fragment until the total number of link replacements plus the replacement of the first link with a copy of the fragment, equals the metadata reference count for links associated with the original fragment of the target data object.

At block 440, methods delete the target data object, satisfying the received instructions.

Disclosed embodiments enable the deduplication of stored data yielding large savings in required storage resources for a given set of versioned documents and potentially across sets of similar documents.

EXAMPLES

As an illustration of the value and efficacy of the disclosed embodiment, a MICROSOFT POWERPOINT presentation having 85 slides, file size of 6228 KB was modified to fix a single typographical error in one slide. The revised version of the file was then uploaded to cloud storage. Application of a LINUX command to each version yielded respective sets of 4 KB data blocks. A comparison of the 4 KB data blocks of the original version and the revised versions identified no overlaps between the two sets of data blocks. This method of deduplication yielded no results, indicating a need to save complete copies of each version.

Application of disclosed embodiments to the original and revised objects unzips (decompresses) each of the compressed zip file objects into a respective directory of XML files. In the example, each directory contained 849 files. A directory based comparison of the two directories identified 15 files which differed between the two directories, totaling 68 KB, and 6160 KB, of 834 identical files.

Across multiple versions of a single document the potential storage requirement savings may be substantial. Table 1 provides an illustration of the predicted savings for differing numbers of revisions and differing levels of revision.

TABLE 1

| #versions | Savings 2.00% | Savings change 5.00% | Savings 10.00% | Savings 20.00% |
|---|---|---|---|---|
| 1 | 0.00% | 0.00% | 0.00% | 0.00% |
| 2 | 49.00% | 47.50% | 45.00% | 40.00% |
| 5 | 78.40% | 76.00% | 72.00% | 64.00% |
| 10 | 88.20% | 85.50% | 81.00% | 72.00% |
| 25 | 94.08% | 91.20% | 86.40% | 76.80% |
| 50 | 96.04% | 93.10% | 88.20% | 78.40% |
| 100 | 97.02% | 94.05% | 89.10% | 79.20% |

In an embodiment, after receiving a new version of a file (V2.zip), methods decompress the new version and original V1.zip versions into directories v2, and v1 thus exposing the structural fragments of the compressed object format. Methods compare v2 and v1, for example diff v2 v1→d21, which specifies the differences between v2 and v1. Methods then compress d21 to d21.zip and store the V2 file as a tuple [d21.zip, OR(V1.zip)] where OR(x) is an object reference to an object <x>. Subsequent versions are handled in a similar manner such that methods store each subsequent version as a chain of diff results relating to the object reference OR. For instance a $3^{rd}$ version V3 would be represented as a chain of [d32, [d21, OR(V1.zip)]], In reconstructing the original V2.zip document methods reconstruct V1.zip, uncompress d21, and reconstruct V2.zip using V1.zip, and d21.

In an embodiment, methods store original fragments in the most recent version of a document and represent earlier versions of the document as differences to the latest version. In this embodiment, methods receive a new version of a document, V2.zip, and store this new version. Methods decompress V2.zip and V1.zip into directories v2 and v1. Methods then compare v1 and v2, diff v1 v2→d12, which specifies the differences between v1 and v2. Methods then compress d12 to d12.zip. Methods then delete the previous version of v1.zip and store the new version v1.zip=[d12.zip+ OR(V2.zip)]. In reconstructing the V1.zip document, methods reconstruct V2.zip, uncompress d12, and reconstruct V1.zip using V2.zip, OR, and d12. In this embodiment, methods receive an instruction to delete the latest version, V2.zip. Methods reconstruct V2.zip from the stored compressed copy of the file, reconstruct V1.zip from decompressed d12, V2.zip, and OR, delete V2.zip, and store the reconstructed version of V1.zip. In an embodiment, methods may compress the reconstructed V1.zip prior to storage.

It is to be understood that although this disclosure includes a description on cloud computing, implementation of the teachings recited herein are not limited to a cloud computing environment. Rather, embodiments of the present invention are capable of being implemented in conjunction with any other type of computing environment now known or later developed.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method, the method comprising:
    decompressing, by one or more computer processors, a first data object;
    decompressing, by the one or more computer processors, a second data object into fragments listed in a temporary directory;
    determining, by the one or more computer processors, differences between the first data object and the second data object;
    replacing, by the one or more computer processors, a fragment in the temporary directory which is identical to a fragment of the first data object, with a link to a location of the fragment of the first data object:
    compressing, by the one or more computer processors, the differences;
    deleting, by the one or more computer processors, the second data object;
    storing, by the one or more computer processors, a new version of the second data object as a combination of the differences, and the link to the location of the fragment of the first data object;
    receiving, by the one or more computer processors, instructions to delete the first data object;
    reconstructing, by the one or more computer processors, the first data object;
    reconstructing, by the one or more computer processors, the second data object according to the differences, and the fragment of first data object; and
    storing, by the one or more computer processors, the reconstructed second data object; and deleting the first data object.

2. The method according to claim 1, further comprising:
    retrieving, by the one or more computer processors, the new version of the second data object;
    decompressing, by the one or more computer processors, the fragment of the first data object;
    decompressing, by the one or more computer processors, the differences;
    reconstructing, by the one or more computer processors, the second data object according to the fragment of the first data object, and the differences;
    compressing, by the one or more computer processors, the second data object; and
    providing, by the one or more computer processors, the compressed second data object.

3. A computer program product for storing data objects, the computer program product comprising one or more computer readable storage media and collectively stored program instructions on the one or more computer readable storage media, the stored program instructions which, when executed, cause one or more computer systems to:
  decompress a data object into a directory including a first structural fragment;
  identify, in a second data object, a second structural fragment which is identical to the first structural fragment;
  replace the first structural fragment with a first link to the second structural fragment;
  store the first data object including the link in place of the first structural object;
  delete the directory;
  receive instructions to delete the second data object comprising the second structural fragment;
  identify the first link to the second structural fragment;
  replace the first link with the second structural fragment; and
  delete the second data object.

4. The computer program product according to claim 3, the stored program instructions further causing the one or more computer systems to:
  identify the first link to the second structural fragment;
  replace the link with a copy of the second structural fragment;
  compress the data object comprising the second structural fragment; and
  provide the compressed data object.

5. The computer program product according to claim 3, the stored program instructions further causing the one or more computer systems to:
  increment meta data associated with the second structural fragment in the second data object;
  identify links to the second structural fragment in the second data object according to the meta data; and
  replace the links to the second structural fragment in the second data object with links to the second structural fragment in the first data object.

6. The computer program product according to claim 3, the stored program instructions further causing the one or more computer systems to compress the first data object.

7. The computer program product according to claim 3, the stored program instructions further causing the one or more computer systems to generate a hash function value for the first structural fragment; and identifying the second structural fragment according to the hash function value.

8. The computer program product according to claim 3, the stored program instructions further causing the one or more computer systems to:
  compress the first data object comprising the first link;
  store the compressed first data object;
  retrieve the first data object;
  decompress the first data object;
  identify the first link to the second structural fragment;
  replace the link with a copy of the second structural fragment;
  compress the data object comprising the second structural fragment; and
  provide the compressed data object.

9. A computer system for storing data objects, the computer system comprising:
  one or more computer processors;
  one or more computer readable storage media; and
  stored program instructions on the one or more computer readable storage media for execution by the one or more computer processors, the stored program instructions which, when executed, cause the one or more computer processors to:
  decompress a data object into a directory including a first structural fragment;
  identify, in a second data object, a second structural fragment which is identical to the first structural fragment;
  replace the first structural fragment with a first link to the second structural fragment;
  store the first data object including the link in place of the first structural object;
  delete the directory:
  receive instructions to delete the second data object comprising the second structural fragment;
  identify the first link to the second structural fragment;
  replace the first link with the second structural fragment; and
  delete the second data object.

10. The computer system according to claim 9, the stored program instructions further causing the one or more processors to:
  identify the first link to the second structural fragment;
  replace the link with a copy of the second structural fragment;
  compress the data object comprising the second structural fragment; and
  provide the compressed data object.

11. The computer system according to claim 9, the stored program instructions further causing the one or more processors to:
  increment meta data associated with the second structural fragment in the second data object;
  identify links to the second structural fragment in the second data object according to the meta data; and
  replace the links to the second structural fragment in the second data object with links to the second structural fragment in the first data object.

12. The computer system according to claim 9, the stored program instructions further causing the one or more processors to generate a hash function value for the first structural fragment; and identifying the second structural fragment according to the hash function value.

13. The computer system according to claim 9, the stored program instructions further causing the one or more processors to:
  compress the first data object comprising the first link;
  store the compressed first data object;
  retrieve the first data object;
  decompress the first data object;
  identify the first link to the second structural fragment;
  replace the link with a copy of the second structural fragment;
  compress the data object comprising the second structural fragment; and
  provide the compressed data object.

14. A computer implemented method for storing compressed data objects, the method comprising:
  decompressing a data object into a directory including a first structural fragment;
  identifying, in a second data object, a second structural fragment which is identical to the first structural fragment;

replacing the first structural fragment with a first link to the second structural fragment in the second data object;

storing the first data object including the link in place of the first structural object;

deleting the directory;

receiving instructions to delete the second data object comprising the second structural fragment;

identifying the first link to the second structural fragment;

replacing the first link with the second structural fragment; and deleting the second data object.

15. The computer implemented method according to claim 14, further comprising:

identifying the first link to the second structural fragment:

replacing the link with a copy of the second structural fragment;

compressing the data object comprising the second structural fragment; and providing the compressed data object.

16. The computer implemented method according to claim 14, further comprising:

incrementing meta data associated with the second structural fragment in the second data object;

identifying links to the second structural fragment in the second data object according to the meta data; and replacing the links to the second structural fragment in the second data object with links to the second structural fragment in the first data object.

17. The computer implemented method according to claim 14, further comprising compressing the first data object.

18. The computer implemented method according to claim 14, further comprising generating a hash function value for the first structural fragment; and identifying the second structural fragment according to the hash function value.

19. The computer implemented method according to claim 14, further comprising:

compressing the first data object comprising the first link;

storing the compressed first data object;

retrieving the first data object from storage;

decompressing the first data object;

identifying the first link to the second structural fragment:

replacing the link with a copy of the second structural fragment;

compressing the data object comprising the second structural fragment; and providing the compressed data object.

20. A computer implemented method for storing compressed data objects, the method comprising:

receiving, by one or more computer processors, a first data object comprising a first structural fragment identifying, by the one or more computer processors, in a second data object, a second structural fragment which is identical to the first structural fragment;

replacing, by the one or more computer processors, the first structural fragment with a first link to the second structural fragment in the second data object;

storing, by the one or more computer processors, the first data object including the link in place of the first structural object;

receiving instructions to delete the second data object comprising the second structural fragment;

identifying the first link to the second structural fragment;

replacing the first link with the second structural fragment; and deleting the second data object.

21. The computer implemented method according to claim 20, further comprising:

identifying, by the one or more computer processors, the first link to the second structural fragment:

replacing, by the one or more computer processors, the link with a copy of the second structural fragment; and providing, by the one or more computer processors, the compressed data object.

* * * * *